United States Patent
Kariya et al.

(10) Patent No.: US 7,793,538 B2
(45) Date of Patent: Sep. 14, 2010

(54) APPARATUS FOR DIAGNOSING ABNORMAL OPERATION OF PRESSURE DIFFERENCE DETECTION APPARATUS OF INTERNAL COMBUSTION ENGINE EXHAUST SYSTEM

(75) Inventors: Yasuhiro Kariya, Oobu (JP); Shigeto Yahata, Oobu (JP); Kazuharu Tochikawa, Kariya (JP)

(73) Assignee: Denso Corporation, Kariya (JP)

( * ) Notice: Subject to any disclaimer, the term of this patent is extended or adjusted under 35 U.S.C. 154(b) by 516 days.

(21) Appl. No.: 11/937,323

(22) Filed: Nov. 8, 2007

(65) Prior Publication Data

US 2008/0110238 A1    May 15, 2008

(30) Foreign Application Priority Data

Nov. 14, 2006 (JP) .............................. 2006-307400

(51) Int. Cl.
*G01M 15/00* (2006.01)

(52) U.S. Cl. .................................................. 73/114.69
(58) Field of Classification Search ....................... None
See application file for complete search history.

(56) References Cited

FOREIGN PATENT DOCUMENTS

JP        2005-307880        11/2005

*Primary Examiner*—Robert R Raevis
(74) *Attorney, Agent, or Firm*—Nixon & Vanderhye PC

(57) ABSTRACT

A diagnostic apparatus monitors a pressure difference detection apparatus that detects the pressure difference across an engine exhaust gas cleansing device in an exhaust gas system, with the diagnostic apparatus recognizing a condition of impeded transfer of gas between the pressure difference detection apparatus and the exhaust gas system, based upon a manner of convergence of successive detected pressure difference values that are produced by the pressure difference detection apparatus following a change in the exhaust gas flow rate.

15 Claims, 7 Drawing Sheets

FIG. 3(a) ENGINE SPEED

FIG. 3(b) EXHAUST GAS VOLUMETRIC FLOW RATE Vex

FIG. 3(c) DETECTED PRESSURE DIFFERENCE DP
NORMAL OPERATION
ABNORMAL OPERATION

FIG. 3(d) ESTIMATED AMOUNTS OF ACCUMULATED PARTICULATE MATTER
PRE-ACCELERATION REFERENCE VALUES
PM1 VALUES
PM2 VALUES

FIG. 3(e) PM2 CALCULATION ENABLE FLAG — ENABLED / INHIBITED

FIG. 3(f) AMOUNTS OF CHANGE IN PM1 AND PM2
ΔPM2
ΔPM1

FIG. 3(g) ABNORMAL OPERATION JUDGEMENT FLAG — PROVISIONAL DECISION / DEFINITIVE DECISION

APPARATUS FOR DIAGNOSING ABNORMAL OPERATION OF PRESSURE DIFFERENCE DETECTION APPARATUS OF INTERNAL COMBUSTION ENGINE EXHAUST SYSTEM

CROSS-REFERENCE TO RELATED APPLICATIONS

This application is based on and incorporates herein by reference Japanese Patent Application No. 2006-307400 filed on Nov. 14, 2006.

BACKGROUND OF THE INVENTION

1. Field of Application

The present invention relates to an internal combustion engine having an exhaust gas cleansing device in the exhaust system of the engine and a pressure difference detection apparatus for detecting a pressure difference developed across the exhaust gas cleansing device. In particular, the invention relates to a diagnostic apparatus capable of diagnosing a specific cause of abnormal operation of the pressure difference detection apparatus.

2. Description of Related Art

As described for example in Japanese patent publication No. 2005-3078830 (designated in the following as reference document 1), it is known to detect abnormal operation of a pressure difference detection apparatus used in the exhaust system of a diesel engine, with the detection of abnormal operation being based upon detection results obtained by the pressure difference detection apparatus. Such a pressure difference detection apparatus is used to detect the pressure difference appearing across an exhaust gas cleansing device called a DPF (diesel particulate filter) which passes the exhaust gas flow from the engine. Specifically, the pressure difference detection apparatus detects the pressure difference between the respective interiors of a first tube (i.e., passage) that communicates with the exhaust gas flow upstream from the DPF and a second tube that communicates with the exhaust gas flow downstream from the DPF.

Such a diagnostic apparatus calculates an estimated amount of accumulated particulate matter in the DPF (i.e., which is obstructing the flow of exhaust gas through the DPF), based on the running conditions of the engine, with such an estimated amount of particulate matter being referred to in the following as the operation history-based estimated amount PM1. In addition, the diagnostic apparatus calculates a second estimated value of that accumulated amount of particulate matter, based on the detected pressure difference between upstream and downstream locations with respect to the DPF in the exhaust gas flow, as obtained by the pressure difference detection apparatus, with such an estimated amount of particulate matter being referred to in the following as the pressure difference-based estimated amount PM2. Based on the estimated value of PM2 (more specifically, the most recently derived value of PM2) and a threshold value that is determined based on the operation history-based estimated amount PM1, a decision is made as to whether abnormal operation of the pressure difference detection apparatus is occurring.

Due to the fact that the aforementioned first tube of the pressure difference detection apparatus is located upstream from the DPF, communicating with the exhaust gas flow (i.e., with the interior of a gas flow passage constituted by an exhaust pipe of the engine) particulate matter becomes deposited within that tuber so that blockage can occur not only within the exhaust pipe due to accumulated particulate matter in the DPF, but may also occur within the upstream-side tube of the pressure difference detection apparatus. If such flow obstruction in the upstream-side tube occurs, then when the diagnostic apparatus detects that there is abnormal operation of the pressure difference sensor, it is difficult for the diagnostic apparatus to diagnose that the abnormal operation is being caused specifically by blockage of the upstream-side tube, rather than by some other cause such as an electrical fault in the pressure difference detection apparatus.

Hence, this is an obstacle to taking appropriate countermeasures against the specific cause of the abnormal operation of the pressure difference detection apparatus.

SUMMARY OF THE INVENTION

It is an objective of the present invention to overcome the above problem by providing a diagnostic apparatus for a pressure difference detection apparatus of an internal combustion engine in which the pressure difference detection apparatus detects a pressure difference between positions in the exhaust gas system of the engine that are located respectively upstream and downstream from an exhaust gas cleansing device in the exhaust gas system, whereby the diagnostic apparatus can detect abnormal operation of the pressure difference detection apparatus and can diagnose the abnormal operation as being caused specifically by impeded transfer of gas between the exhaust gas system and the pressure difference sensor, with the abnormal operation detection and diagnosis being based on detection results obtained from the pressure difference sensor To achieve the above objectives, a diagnostic apparatus according to the present invention comprises judgement circuitry adapted to recognize such a condition of impeded transfer of gas based upon a manner in which detection produced from the pressure difference detection apparatus converge to a specific value, following completion of a transient change in flow rate of the exhaust gas. The term "transient change", as applied to a gas flow rate in this specification and the appended claims, signifies a change from one value of steady state flow rate to a different value of steady state flow rate.

When there is an obstruction to the transfer of gas between the exhaust system and the pressure difference detection apparatus, i.e., blockage of a passage that communicates between the exhaust system and the pressure difference detection apparatus, the diagnostic apparatus becomes unable to rapidly respond to changes in pressure that occur in the exhaust gas system due to a transient change in the exhaust gas flow rate. As a result, following such a transient change, e.g., an increase in the exhaust gas flow rate, the successive values of pressure difference detected by the pressure difference detection apparatus will only gradually increase, until converging to an appropriate stable value. If the time taken to converge to the appropriate value is excessive, then this can be taken as an indication of abnormal operation of the pressure difference detection apparatus that is caused by impeded transfer of gas (blockage) between the exhaust system and the pressure difference detection apparatus.

When a transient change in the exhaust gas flow rate is relatively small in magnitude, then the change that occurs between the pressure difference value detected prior to the transient change and the pressure differences detected immediately following completion of the transient change will be correspondingly small. Hence, it is difficult to utilize the detection results obtained following a small-magnitude transient change for diagnosing abnormal operation of the pressure difference detection apparatus. For that reason, diagnosis is preferably only performed when the magnitude of a transient change in the exhaust gas flow rate exceeds a predetermined threshold value.

Such a diagnostic apparatus preferably comprises circuitry adapted to derive an estimated actual amount of accumulated particulate matter that is within the exhaust gas cleansing device upon completion of the transient change, with that estimate being obtained independently of the pressure difference detection apparatus, and also estimate that residual amount of accumulated particulate matter based upon the detection results from the pressure difference detection apparatus. In that case, the judgement circuitry performs the diagnosis based upon a manner in which successively obtained values of the latter amount of accumulated particulate matter converge to the former (estimated actual) amount of accumulated particulate matter, after completion of the transient change in the exhaust gas flow rate.

More specifically, to achieve this the diagnostic apparatus can comprise:

first estimation circuitry adapted to calculate a first estimated accumulated amount of particulate matter within the exhaust gas cleansing device, by periodically calculating successive estimated incremental amounts of the particulate matter and integrating the incremental amounts, with each the incremental amount being estimated based upon a current operating condition of the internal combustion engine, and second estimation circuitry adapted to calculate a second estimated accumulated amount of particulate matter within the exhaust gas cleansing device, based upon currently derived values of the exhaust gas flow rate and the detected pressure difference, in combination.

In that case, the judgement circuitry derives the manner of convergence of the detected pressure difference values based upon the manner of variation of the second estimated accumulated amount of particulate matter with respect to the first estimated accumulated amount of particulate matter following completion of the transient change in the exhaust gas flow rate.

This is based on the fact that the values obtained for the first estimated accumulated amount of particulate matter are unaffected by abnormal operation of the pressure difference detection apparatus, whereas the values obtained for the second estimated accumulated amount of particulate matter are directly dependent on the detected pressure difference values. Hence if there is impeded transfer of gas between the pressure difference detection apparatus and the exhaust gas system, then following a transient change in the exhaust gas flow rate, the successive values obtained for the second estimated accumulated amount of particulate matter will only gradually converge to the first estimated accumulated amount of particulate matter.

In practice, even during steady-stated exhaust gas flow, the first estimated accumulated amount of particulate matter and second estimated accumulated amount of particulate matter will in general not be identical to one another. For that reason, it is preferable to calculate the amount of change that occur in the first estimated accumulated amount of particulate matter between the start and end of a transient change in exhaust gas flow rate, and to calculate successive amounts of change that occur in the values of the second estimated accumulated amount of particulate matter following the transient change in flow rate (i.e., amounts of change in the second estimated amount with respect to a value immediately prior to the transient change in flow rate). In that case, the manner in which the successive amounts of change in value of the second estimated accumulated amount of particulate matter converge to the aforementioned amount of change in the first estimated accumulated amount of particulate matter will accurately correspond to the manner in which the detected pressure difference values converge to an appropriate (steady-state) value following that transient change.

Specifically, such a diagnostic apparatus can diagnose that abnormal operation of the pressure difference detection apparatus is occurring due to impeded transfer of gas between that apparatus and the exhaust gas system when the conditions are satisfied that:

(a) the absolute difference between respective amounts of change in the first and second estimated accumulated amounts of particulate matter following completion of a transient change in exhaust gas flow rate attains a predetermined threshold value, and also (b) that absolute difference falls below the threshold value during a predetermined time interval following the completion of the transient change in exhaust gas flow rate.

If the threshold value is exceeded, and also the absolute difference does not fall below the threshold value within the predetermined time interval, then this is taken as signifying that abnormal operation of the pressure difference detection apparatus is occurring due to some cause other than impeded transfer of gas between that apparatus and the exhaust gas system, e.g., is resulting from an electrical problem or sensor defect, etc.

Hence, the invention enables abnormal operation that is caused by blockage of a passage between the exhaust gas system and the pressure difference detection apparatus (i.e., due to an accumulation of particulate matter in that passage) to be accurately distinguished from other causes of abnormal operation of the pressure difference detection apparatus, so that countermeasures can be taken for recovery from that specific abnormal operation condition.

The above and other features are described more specifically in the following, referring to embodiments of the invention.

BRIEF DESCRIPTION OF THE DRAWINGS

FIGS. 3(a) to 3(g) are timing diagrams for illustrating processing that is executed for diagnosing occurrence of blockage in a pressure difference detection apparatus, with the first embodiment;

DESCRIPTION OF PREFERRED EMBODIMENTS

First Embodiment

Figure 1:
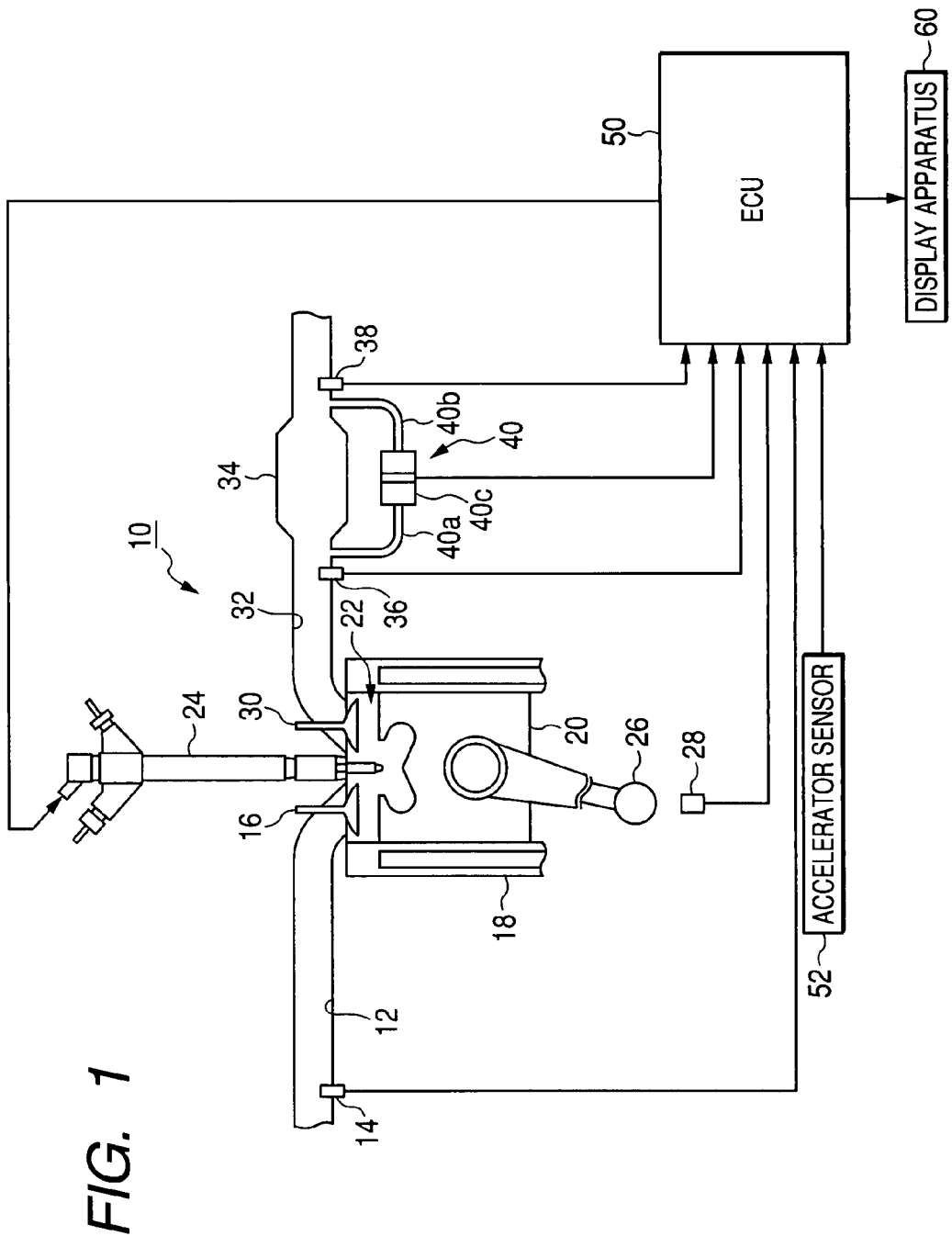
FIG. 1 shows the overall configuration of an engine system incorporating a first embodiment.

FIG. 1 shows the overall configuration of a vehicle internal combustion engine system 10 that incorporates a first embodiment of the invention, with the operation of a single cylinder of the engine being summarized in the following. As shown, an air flow meter 14 is disposed in an intake manifold 12 of a diesel engine 10, for detecting the flow rate of intake air of the engine. When the intake valve 16 opens, the intake manifold 12 communicates with a combustion chamber 22 that is formed between the engine block 18 and piston 20. A fuel injector 24 protrudes into the combustion chamber 22, for injecting fuel into the combustion chamber 22 after the intake valve 16 is closed, to effect combustion. When this occurs, with the fuel igniting due to heating caused by air pressure within the combustion chamber 22, energy is generated for driving the piston 20, which is converted into rotational energy by the crankshaft 26, to thereby rotate the engine shaft. A crank angle sensor 28 is located close to the crankshaft 26 for detecting the rotation angle (crank angle) of the crankshaft 26.

Following fuel injection and combustion, an exhaust valve 30 is opened, allowing exhaust gas resulting from the combustion to exit through an exhaust pipe 32. A DPF (diesel particulate filter) 34 is installed within the exhaust pipe 32 for cleansing the exhaust gas by catalytic oxidization. An upstream exhaust gas temperature sensor 36, for detecting the temperature of the exhaust gas, is located upstream from the DPF 34 within the exhaust pipe 32. In addition a downstream exhaust gas temperature sensor 38 is located downstream from the DPF 34 within the exhaust pipe 32, for also detecting the exhaust gas temperature. A pressure difference detection apparatus 40 is connected to the exhaust pipe 32 for detecting a pressure difference that is developed across the DPF 34 (i.e., a pressure difference between locations within the exhaust pipe 32 that are respectively upstream and downstream with respect to the DPF 34). The pressure difference detection apparatus 40 is made up of an upstream-side tube 40a which communicates with a location in the exhaust pipe 32 upstream from the DPF 34, a downstream-side tube 40b which communicates with a location in the exhaust pipe 32 downstream from the DPF 34, and a sensing section 40c which detects the pressure difference between the respective interiors of the upstream-side tube 40a and downstream-side tube 40b. The sensing section 40c can for example be configured as a combination of a pressure sensor and a circuit for amplifying a detection signal produced from the sensor.

An ECU (electronic control unit) 50, which is based on a microcomputer, acquires detection results from various sensors of the diesel engine 10, including detection results from an accelerator sensor 52 which detects the degree of actuation of the accelerator pedal of the vehicle. Based on these inputs, the ECU 50 controls various actuators including the fuel injector 24, for controlling operating parameters (including engine crankshaft speed and output torque) of the diesel engine 10.

The ECU 50 determines an appropriate amount of fuel to be injected in each fuel injection operation by the fuel injector 24, for obtaining a requisite level of output torque (the demand torque) based on the degree of actuation of the accelerator pedal that is detected by the accelerator sensor 52 and upon the engine speed (crankshaft rotation speed) as detected by the crank angle sensor 28.

In addition, in conjunction with controlling the fuel injection amounts, the ECU 50 estimates the amount of particulate matter that has accumulated in the DPF 34. When the estimated amount of accumulated particulate matter exceeds a predetermined value, control is performed for regenerating the DPF 34. Information produced by the ECU 50 is displayed by a display apparatus 60.

Figure 2:
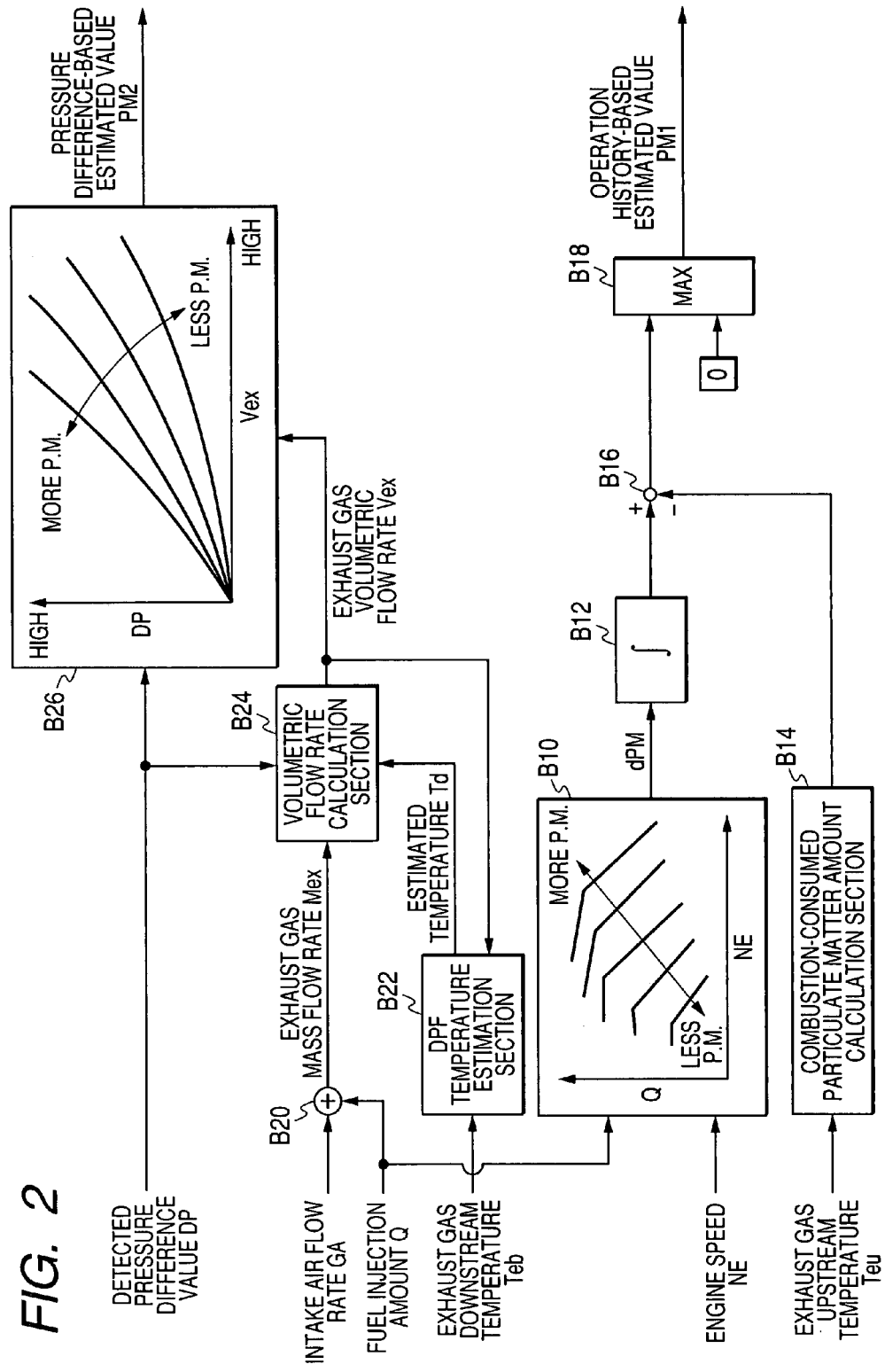
FIG. 2 is a block diagram for conceptually illustrating processing executed for estimating an accumulated amount of particulate matter with the first embodiment.

FIG. 2 is a conceptual block diagram for describing a processing routine that is repetitively performed by the ECU 50, specifically, processing related to estimating the estimated amount of accumulated particulate matter in the DPF 34. In FIG. 2, processing functions performed by operation of the ECU 50 are represented as respective blocks B10, etc.

With this embodiment, the ECU 50 calculates successive values of the operation history-based estimated amount of particulate matter PM1 in the DPF 34 based on integrating successively estimated new amounts of accumulated particulate matter, with each of these new amounts being derived based on the running condition of the diesel engine 10 at the time. In addition, the ECU 50 calculates the pressure difference-based estimated amount of particulate matter PM2 in the DPF 34, based on the pressure difference DP detected by the pressure difference detection apparatus 40 and the volumetric flow rate of exhaust gas.

The method of calculating the operation history-based estimated amount PM1 will be described in the following. As shown in FIG. 2, an incremental particulate matter amount calculation section B10 calculates successive incremental amounts of accumulated particulate matter dPM corresponding to respective unit time intervals, based on the running condition of the diesel engine 10 during each time interval. Specifically, with this embodiment each incremental amount of particulate matter is calculated based on respective values of fuel injection quantity Q and engine speed (crankshaft rotation speed) NE, which are determined by the demand torque. As indicated, the higher the engine speed NE and the greater the fuel injection quantity Q, the greater will become the calculated value of each incremental amount of particulate matter.

An integrator section B12 calculates an updated value of an estimated amount of accumulated particulate matter each time that a new incremental amount of particulate matter is calculated. A combustion-consumed particulate matter amount calculation section B14 calculates an amount of particulate matter that has been consumed by combustion before reaching the DPF 34, during the unit time interval. Specifically, with this embodiment, since it is known that the higher the temperature at which the exhaust gas enters the DPF 34, the greater will be the degree of combustion of particulate matter, the amount of particulate matter that has been consumed by combustion is calculated based on the temperature Teu that is detected by the upstream exhaust gas temperature sensor 36.

A subtractor section B16 subtracts the output value obtained by the combustion-consumed particulate matter amount calculation section B14 from the value obtained by the integrator section B12. A lower-limit guard processing section B18 performed processing to set the lower limit of the output value from the subtractor section B16 to zero. This is done to ensure that the estimated amount of accumulated particulate matter in the DPF 34 does not fall below zero, and the resultant output value from the lower-limit guard processing section B18 constitutes the operation history-based estimated amount PM1.

The method of calculating the pressure difference-based estimated amount PM2 will be described in the following. An exhaust gas mass flow rate calculation section B20 calculates an exhaust gas mass flow rate Mex as the sum of the air intake rate GA that is detected by the air flow meter 14 and the fuel injection amount Q, with the value of the fuel injection amount Q being determined by the demand torque. A DPF temperature estimation section B22 estimates the temperature Td of the DPF 34 from the detected value of downstream exhaust gas temperature Teb. Various methods of estimating the internal temperature of an exhaust gas purification device have been proposed, and the invention is not limited to any specific method. With this embodiment, the estimation is based on the fact that in steady-state operation (constant rate of exhaust gas flow), the temperature Teb that is detected by the downstream exhaust gas temperature sensor 38 becomes identical to the temperature of the DPF 34, whereas during a transient change in the exhaust gas flow rate (i.e., due to a change in the accelerator pedal actuation, for effecting acceleration or deceleration of the vehicle) Teb becomes different from the temperature of the DPF 34.

The downstream exhaust gas temperature Teb can be expressed by a one-dimensional model of the delay time and dead time of the temperature of the DPF 34. Hence by using the detected value of downstream exhaust gas temperature Teb in the inverse model, an estimated value Td of the temperature of the DPF 34 is obtained. The delay time and dead time are variables, whose values are respectively set in accordance with an exhaust gas volumetric flow rate Vex, described hereinafter This method of temperature estimation is described in detail in Japanese patent publication No. 2004-254109.

The volumetric flow rate calculation section B24 calculates the exhaust gas volumetric flow rate Vex based on the exhaust gas mass flow rate Mex and on the pressure difference DP that is detected by the pressure difference detection apparatus 40.

The pressure difference-based estimation section B26 calculates the pressure difference-based estimated amount PM2 based on the exhaust gas volumetric flow rate Vex and the pressure difference DP. As illustrated in FIG. 2, the higher the value of Vex and the higher the value of DP, the greater will be the calculated value of the pressure difference-based estimated amount PM2.

In that way, respective updated values of the operation history-based estimated amount PM1 and the pressure difference-based estimated amount PM2 are calculated at successive fixed time intervals, and these can be used to detect obstruction of the DPF 34 due to accumulated particulate matter. That information can be used to apply control for regeneration of the DPF 34 before excessive blockage occurs.

In general, during steady-state operation (when the exhaust gas flow rate is unchanging), the pressure difference-based estimated amount PM2 will express the actual amount of accumulated particulate matter in the DPF 34 more accurately than the operation history-based estimated amount PM1. Hence, it would be possible to apply correction to the operation history-based estimated amount PM1 based on the value obtained for pressure difference-based estimated amount PM2, during steady-state operation.

Due to the fact that the upstream-side tube 40a of the pressure difference detection apparatus 40 communicates with a location in the exhaust pipe 32 that is upstream from the DPF 34, there blockage of the interior of the upstream-side tube 40a can occur due to an accumulation of particulate matter. Transfer of exhaust gas from the exhaust pipe 32 through the upstream-side tube 40a may be thereby obstructed, causing the accuracy of the pressure difference DP obtained from the pressure difference detection apparatus 40 to become lowered. In particular, when there is a change in the pressure difference between positions upstream and downstream from the DPF 34 due to a change in the exhaust gas volumetric flow rate Vex, there will be a delay in detecting that change in pressure difference by the pressure difference detection apparatus 40, as corresponding changes in successive values obtained for the detected pressure difference DP.

However with this embodiment, such blockage of the upstream-side tube 40a can be judged based upon the state of convergence of values that are successively obtained based on the pressure difference DP, following completion of a transient change in the exhaust gas volumetric flow rate Vex. Specifically, at the end of such a transient condition, an estimate of the accumulated amount of particulate matter in the DPF 34 is calculated (independently of the results from the pressure difference detection apparatus 40), as the operation history-based estimated amount PM1. In addition, the pressure difference-based estimated amount PM2 is calculated, i.e., based on the detected pressure difference DP from the pressure difference detection apparatus 40. When there is blockage of the upstream-side tube 40a, then the longer the time taken for the detected pressure difference DP to converge to the actual pressure difference, following a transient change in the exhaust gas flow rate, the longer will be the time taken for the pressure difference-based estimated amount PM2 to converge to the value of the actual accumulated amount of particulate matter, as represented by the operation history-based estimated amount PM1.

Hence, the manner of convergence of the pressure difference DP towards the actual pressure difference across the DPF 34, following a change in the exhaust gas volumetric flow rate Vex, can be obtained based on the manner in which the pressure difference-based estimated amount PM2 converges to a specific value following that change in flow rate, and in particular, the manner in which the pressure difference-based estimated amount PM2 converges to the operation history-based estimated amount PM1 following the change in flow rate. In that way, the pressure difference-based estimated amount PM2, or the operation history-based estimated amount PM1 and the pressure difference-based estimated amount PM2 in combination, can be used to diagnose occurrence of blockage of the upstream-side tube 40a.

FIGS. 3(a), 3(b), 3(c), 3(d), 3(e), 3(f), 3(g) are timing diagrams illustrating changes which occur in various parameters when the exhaust gas flow rate momentarily increases, under a condition of blockage of the upstream-side tube 40a. FIG. 3(a) shows the changes which occur in the engine speed, FIG. 3(b) shows the changes which occur in the exhaust gas volumetric flow rate Vex, FIG. 3(c) shows the changes which occur in the pressure difference DP that is detected by the pressure difference detection apparatus 40, FIG. 3(d) shows the changes which occur in the values obtained for the operation history-based estimated amount PM1 and the pressure difference-based estimated amount PM2, FIG. 3(e) shows the changes which occur in a flag which indicates whether calculation of the pressure difference-based estimated amount PM2 is enabled, FIG. 3(f) shows the changes which occur in values ΔPM1, ΔPM2, which are respective amounts of difference between a currently derived value of the parameter PM1 or PM2 and a value of that parameter immediately prior to the increase in flow rate. FIG. 3(g) shows the changes which occur in flags that respectively indicate a provisional decision of abnormal operation of the pressure difference detection apparatus 40 and a definitive decision of abnormal operation of the pressure difference detection apparatus 40.

As shown, when engine acceleration begins at time point t1, causing the engine speed to increase until the time point t2, the exhaust gas volumetric flow rate Vex correspondingly increases during the interval from t1 to t2, and subsequently attains a steady stated at time point t3. With this embodiment, as indicated in FIG. 3(e), calculation of the pressure difference-based estimated amount PM2 (i.e., calculation of successive values of that parameter) is inhibited during that interval from t1 to t3, in which the exhaust gas volumetric flow rate Vex is changing. This is because it is not possible to use the pressure difference DP detected by the pressure difference detection apparatus 40 to accurately estimate the accumulated amount of particulate matter while the exhaust gas volumetric flow rate Vex is changing. As shown in FIG. 3(g), the exhaust gas volumetric flow rate Vex thereafter returns to a steady-state condition at time point t3, so that calculation of successive values of pressure difference-based estimated amount PM2 is resumed. At that point, the value obtained for the pressure difference-based estimated amount PM2 is smaller than operation history-based estimated amount PM1, and pressure difference-based estimated amount PM2 thereafter gradually increases towards operation history-based estimated amount PM1. This is due to the fact that at that time, as a result of the blockage of the upstream-side tube 40a, the pressure difference DP detected by the pressure difference detection apparatus 40 is smaller than the actual pressure difference, as illustrated by the full-line portion in FIG. 3(c), with the pressure difference DP gradually increasing to converge to the actual pressure difference value. As shown, this convergence is not completed until a time subsequent to the point (t3) at which exhaust gas volumetric flow rate Vex returns to the steady-state condition.

Thus since as described above, the smaller the value of the detected pressure difference DP the smaller will be the value obtained for the pressure difference-based estimated amount PM2, the pressure difference-based estimated amount PM2 gradually increases in accordance with the increases in DP, as shown in FIG. 3(d).

The above features are used with this embodiment for judging whether blockage of the pressure difference detection apparatus 40 (i.e., of the upstream-side tube 40a) is occurring, based on the state of convergence of a parameter ΔPM2 to the value of a parameter ΔPM1, as illustrated in FIG. 3(f). Here, ΔPM1 is the amount of change in the operation history-based estimated amount PM1 with respect to its value prior to the increase in the exhaust gas volumetric flow rate Vex. Similarly, ΔPM2 is an amount of change in the operation history-based estimated amount PM1 with respect to its value prior to the increase in the exhaust gas volumetric flow rate Vex. Thus as shown in FIG. 3(f), the change amount ΔPM2 gradually converges to the change amount ΔPM1 after completion of the change in the exhaust gas volumetric flow rate Vex.

The reason for utilizing the change amounts ΔPM1 and ΔPM2 rather than directly utilizing the values of PM1 and PM2 is that it is possible for PM1 and PM2 to have respectively different values prior to the start of the increase in the exhaust gas volumetric flow rate Vex at t1. However as shown, the operation history-based estimated amount PM1 does not change significantly as a result of the increase in the exhaust gas volumetric flow rate Vex. Hence, by utilizing the state of convergence of the change amount ΔPM2 towards the change amount ΔPM1 following completion of the transient change in the flow rate, the manner of convergence of the pressure difference DP to the actual value of pressure difference can be accurately obtained, based on the manner of convergence of ΔPM2 to the steady state value of ΔPM1.

Specifically, if the change amount ΔPM2 is found to exceed the change amount ΔPM1 by more than a predetermined amount after an increase in exhaust gas volumetric flow rate Vex has occurred, then a provisional decision is made that there is abnormal operation caused by blockage of the upstream-side tube 40a. Thereafter, if ΔPM2 converges to the value of ΔPM1 (i.e., steady state value) within a predetermined time interval after the provisional decision has been reached, then a definitive decision is made that such blockage is occurring.

If ΔPM2 does not converge to ΔPM2 within the predetermined time interval, then this indicates a failure of the pressure difference detection apparatus 40 due to some cause other than blockage of the upstream-side tube 40a.

Figure 4:
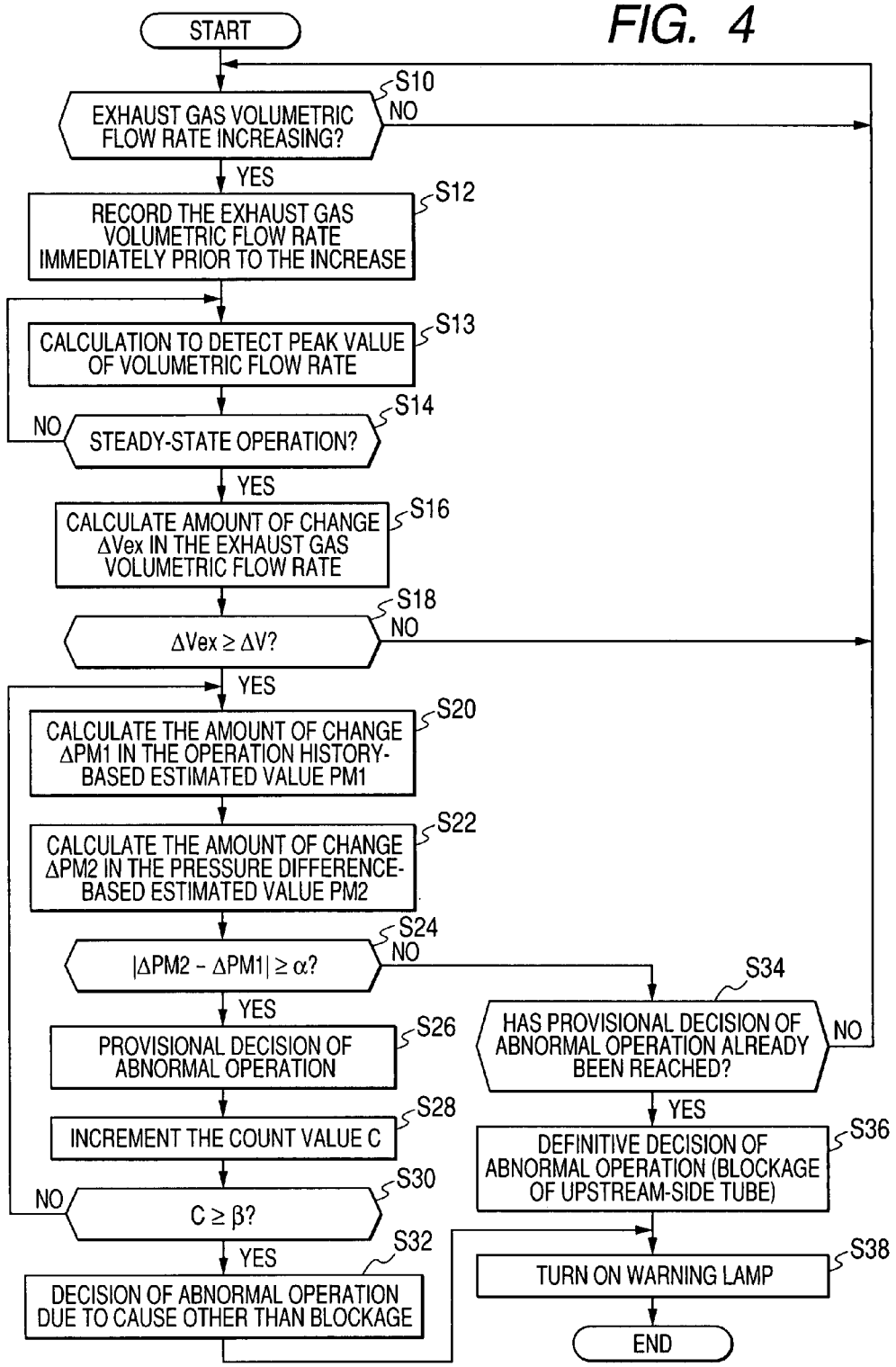
FIG. 4 is a flow diagram of processing executed for diagnosing abnormal operation of the pressure difference detection apparatus, with the first embodiment.

FIG. 4 is a flow diagram of a diagnostic processing routine that is executed by the ECU 50 at periodic intervals, for diagnosing abnormal operation of the pressure difference detection apparatus 40. Firstly in step S10, a decision is made as to whether the exhaust gas flow rate is increasing. If it is increasing, step S12 is executed in which the exhaust gas flow rate value immediately prior to the increase is recorded. Step S13 is then executed, for detecting attainment of a peak value of the exhaust gas volumetric flow rate Vex (i.e., detecting that a point such as the time point t2 in FIG. 3(b) has been reached).

Next in step S14, a decision is made as to whether the exhaust gas flow has reached a steady state (e.g., following the time point t3 in FIG. 3(b)). This decision is made based on the amount of change in flow rate between the current execution of S14 and the preceding execution of that step. If the amount of change is below a predetermined threshold, this signifies that steady-state operation has resumed. In that case, the amount of change in the exhaust gas volumetric flow rate Vex that has occurred (difference between the respective flow rate values at time points t1 and t3 in FIG. 3(b)) is calculated, as ΔVex (step S16).

Next in step S18, a decision is made as to whether ΔVex exceeds a threshold value ΔV. This serves to determine whether diagnosis of blockage of the upstream-side tube 40a can be performed to a sufficient degree of accuracy. That is to say, if ΔVex is not sufficiently large, there will not be a significant difference between the detected pressure difference DP and the actual pressure difference even if blockage is occurring, so that accurate judgement would be difficult. Hence, the threshold value ΔV is set as a boundary valuer for determining whether accurate judgement of blockage can be performed. If ΔVex is found to be greater than the threshold value ΔV then operation proceeds to step S20, in which the change amount ΔPM1 is calculated, i.e., as the difference between the currently obtained value of PM1 and the value of PM1 immediately prior to the start of the increase in the exhaust gas flow rate.

Next in step S22, the change amount ΔPM2 is similarly calculated, as the difference between the currently obtained value of PM2 and the value of PM2 immediately prior to the start of the increase in the exhaust gas flow rate.

In the processing of steps S20, S22, change amount ΔPM1 can be calculated as a difference between respective sample values of PM1, i.e., with the sample values being derived at fixed periodic intervals. Similarly, the change amount ΔPM2 can be calculated as a difference between respective sample values of PM2, with the sample values derived at fixed periodic intervals. Preferably, the sample periods are identical for PM1 and PM2.

Next in step 524, a decision is made as to whether the absolute value of difference between the change amount ΔPM1 and the change amount ΔPM2 exceeds a predetermined threshold value α. This processing serves to judge whether the detected pressure difference DP is in accordance with a pressure difference caused by the accumulated amount of particulate matter in the DPF 34 (i.e., so that blockage of the upstream-side tube 40a is not affecting the detected value of DP). The threshold value α is set to be appropriate for judging whether blockage of the upstream-side tube 40a is occurring. That is to say, α is made sufficiently large to ensure that the effects of blockage of the upstream-side tube 40a can be distinguished from the effects of errors in the calculated values of the change amounts ΔPM1 and ΔPM2, electrical noise, etc.

If DP is found to be greater than α, then operation proceeds to step S26, in which a provisional decision is made that blockage is occurring in the upstream-side tube 40a. Step S28 is then executed, in which a counter value C is incremented. This serves to count the time duration required for the pressure difference-based estimated amount PM2 to converge to the appropriate value. That is to say, this counting serves to measure the time that elapses from the point at which a provisional decision of abnormal operation of the pressure difference detection apparatus 40 is first reached.

Next in step S30, a decision is made as to whether the counter C has exceeded a threshold value β. β is set to be sufficiently high to enable the occurrence of blockage of the upstream-side tube 40a to be reliably judged. Thus if the absolute value of difference between PM1 and PM2 exceeds the threshold value α and the counter C has reached the predetermined value β, a decision is made in step S32 that instead of abnormal operation due to a blockage in the upstream-side tube 40a, there is some other cause, such as a fault in the electrical system of the 40c.

However if it is found in step S30 that the counter C has not yet reached the value β, then operation returns to step S20.

If it is judged in step S24 that the absolute value of difference between ΔPM1 and ΔPM2 is less than the threshold value α, then operation proceeds to step S34 in which a decision is made as to whether a provisional decision of abnormal operation has already been made in step S26. If not, then since this signifies that the pressure difference DP value detected by the pressure difference detection apparatus 40 has quickly converged to the actual pressure difference value, a decision is made that the operation of the pressure difference detection apparatus 40 is normal. Operation then returns to step S10.

However if it is found in step S34 that a provisional decision of abnormal operation has already been reached, then a definitive decision is made in step S36 that there is a blockage of the upstream-side tube 40a.

It can thus be understood that with this processing, if abnormal operation of the pressure difference detection apparatus 40 begins to occur, then after the processing routine of FIG. 4 is started, a NO decision will be made in step S24, and a provisional decision of abnormal operation due to blockage of the upstream-side tube 40a will then be made in step S26. That sequence will be repeatedly executed (so long as the count value β is not yet reached in S28, S30) until the difference between ΔPM1 and ΔPM2 falls below the value α. This indicates that the problem is caused by blockage of the upstream-side tube 40a, so that ΔPM2 has gradually converged to coincide with ΔPM1 as shown in FIG. 3(f). However if the difference does not fall below the threshold value α until a substantial time interval has elapsed (i.e., until the count C has reached the value β) then this is taken to indicate that the problem is due to some cause other than a blockage of the upstream-side tube 40a.

Following step S32 or S36, step S38 is executed in which a warning lamp is turned on, in the display apparatus 60 shown in FIG. 1, to indicate abnormal operation of the pressure difference detection apparatus 40. Execution of the diagnostic processing routine is then ended.

It would be equally possible to modify the above processing such that, when abnormal operation due to blockage is found in step S36 as described above, then specific countermeasures for this cause of abnormal operation are taken. For example, it may be possible to remove such blockage by performed control for regeneration of the DPF 34. In that case, the diagnostic processing routine of FIG. 4 would again be executed after the regeneration of the DPF 34 has been completed.

The following effects are obtained by the above embodiment:

(1) A decision as to whether there is blockage of the upstream-side tube 40a is made based upon the manner in which the pressure difference DP converges towards the actual value of pressure difference across the DPF 34, after completion of a transient interval in which there is a change in the exhaust gas flow rate. Hence, the occurrence of such blockage can be effectively judged.

(2) Judgement to determine whether there is blockage of the upstream-side tube 40a is made only in the event that the amount of change in the exhaust gas flow rate exceeds a predetermined threshold value ΔV. As a result, the judgement can be accurately performed.

(3) The decision as to whether there is blockage of the upstream-side tube 40a is made based upon the manner in which an estimated accumulated amount of particulate matter (PM2) that is derived based on the detected pressure difference value DP converges to a specific value, following a transient change in the exhaust gas flow rate. This enables occurrence of blockage of the upstream-side tube 40a to be reliably diagnosed.

(4) In particular, with this embodiment, the decision as to whether there is blockage of the upstream-side tube 40a is specifically based upon the manner in which the value of change ΔPM2 in the pressure difference-based estimated amount of accumulated particulate matter PM2 in converges to the value of change ΔPM1 in the operation history-based estimated amount of accumulated particulate matter PM1, following a transient change in the exhaust gas flow rate. This enables judgement of occurrence of blockage to be made to a high degree of accuracy, even if the respective values obtained for the operation history-based estimated amount PM1 and the pressure difference-based estimated amount PM2 during steady-state operation of the engine are different from one another.

(5) A provisional decision is made that there is blockage of the upstream-side tube 40a if it is found that the absolute value of the difference between the change amounts ΔPM1 and ΔPM2 is higher than a predetermined threshold value. Thereafter, if the value of the change amount ΔPM2 converges to that of the change amount ΔPM1 within a time interval (after reaching the provisional decision) that does not exceed a predetermined duration, then a definitive decision is made that there is abnormal operation due to a blockage of the upstream-side tube 40a. As a result, it becomes possible to reliably distinguish between abnormal operation of the pressure difference detection apparatus 40 that results from blockage of the upstream-side tube 40a and abnormal operation that has some other cause.

(6) With this embodiment, judgement as to whether there is blockage of the upstream-side tube 40a is performed only when an increase in exhaust gas flow rate occurs. This feature enables the accuracy of judgement to be further increased.

(7) With a pressure difference detection apparatus 40 having tubes 40a, 40b that respectively communicate with locations upstream and downstream from the DPF 34, so that blockage of the upstream tube 40a can occur and the detection accuracy of the pressure difference detection apparatus 40 may be thereby lowered, the above embodiment enables such an occurrence of blockage to be reliably diagnosed, so that appropriate countermeasures can be taken.

Second Embodiment

A second embodiment will be described in the following, with the description centered upon the points of difference from the first embodiment described above.

Figure 5:
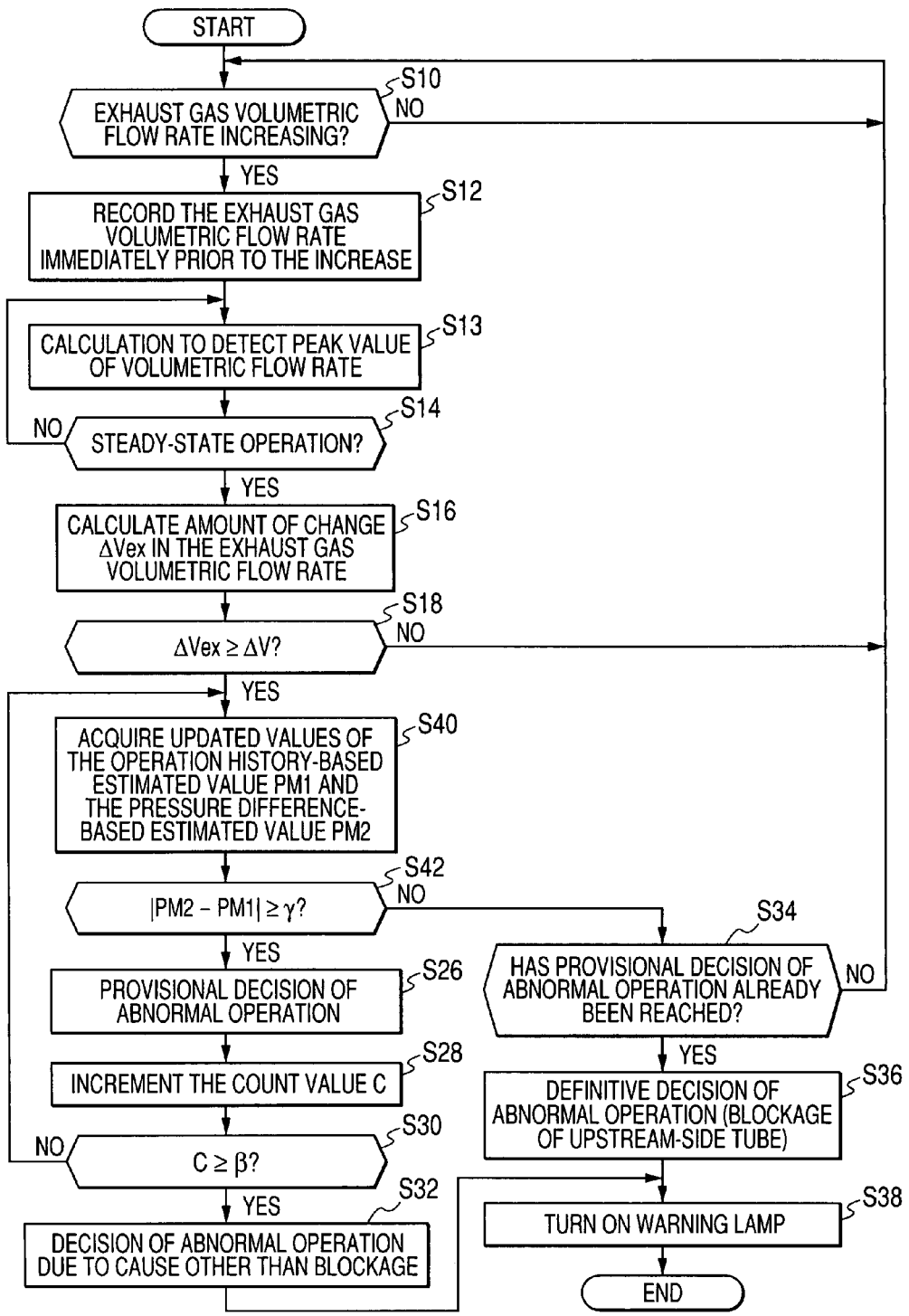
FIG. 5 is a flow diagram of processing executed for diagnosing abnormal operation of the pressure difference detection apparatus, with a second embodiment.

FIG. 5 is a flow diagram of the processing routine that is executed by the ECU 50 of this embodiment for diagnosing abnormal operation of the pressure difference detection apparatus 40, with the routine being executed at periodic intervals. In FIG. 5, processing steps that correspond to processing steps in the flow diagram of FIG. 4 are designated by the same numerals as for the corresponding steps in FIG. 4.

With this embodiment, occurrence of blockage of the upstream-side tube 40*a* is judged based upon the manner in which successive values derived for the pressure difference-based estimated amount PM2 converge to the operation history-based estimated amount PM1, after an increase has occurred in the exhaust gas flow rate. Specifically, if it is judged in step S18 that the amount of change ΔVex in exhaust gas volumetric flow rate exceeds the threshold value ΔV, then operation proceeds to step S40. In S40, respective values of PM1 and PM2 are acquired, then operation proceeds to step S42, in which a decision is made as to whether the absolute value of the difference between PM2 and PM1 exceeds the threshold value γ. This processing serves to judge whether the detected pressure difference DP is accurately following the actual pressure difference across the DPF 34 that results from accumulated particulate matter in the DPF 34. The threshold γ is set at an appropriate value for enabling the presence of blockage to be detected, i.e., is made sufficiently large to ensure that the effects of blockage of the upstream-side tube 40*a* can be distinguished from the effects of errors in the calculated values of the change amounts ΔPM1 and ΔPM2, effects of electrical noise, etc.

With this embodiment, the above-described effects (1) to (3) and (6), (7) described for the first embodiment are also obtained.

Third Embodiment

A third embodiment will be described in the following, with the description being centered upon the points of difference from the first embodiment described above.

Figure 6:
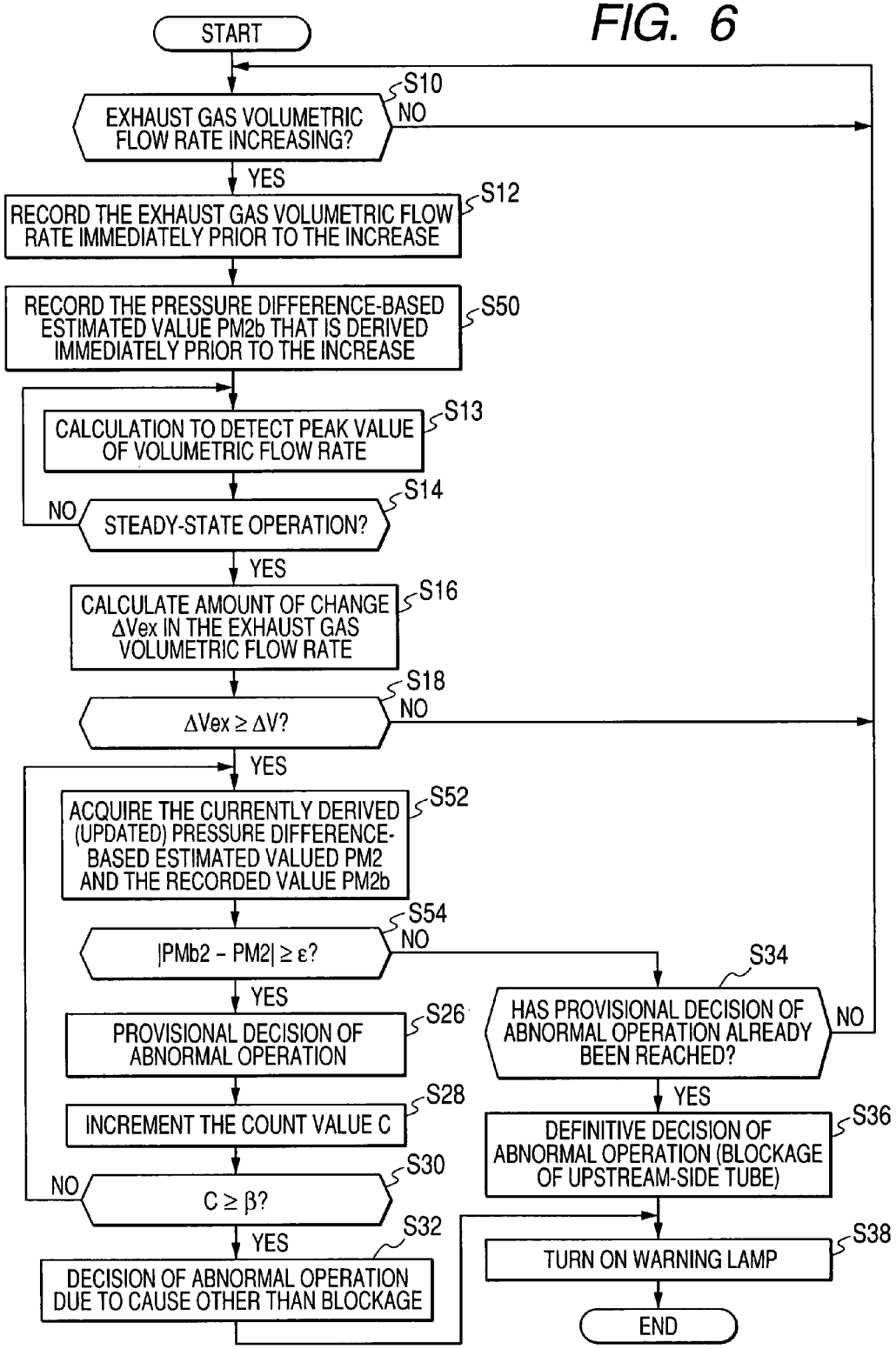
FIG. 6 is a flow diagram of processing executed for diagnosing abnormal operation of the pressure difference detection apparatus, with a third embodiment.

FIG. 6 is a flow diagram of the processing routine that is executed by the ECU 50 of this embodiment for diagnosing abnormal operation of the pressure difference detection apparatus 40, with the routine being executed at periodic intervals. In FIG. 6, processing steps that correspond to processing steps in the flow diagram of FIG. 4 are designated by the same numerals as for the corresponding steps in FIG. 4.

With this embodiment, an approximate value of the accumulated amount of particulate matter that remains following an increase in the exhaust gas flow rate is derived based on the value of the pressure difference-based estimated amount PM2 obtained immediately prior to the increase in flow rate. That is to say, it can be assumed that during a short time interval following the end of an increase in the exhaust gas flow rate, there will be no significant change in the accumulated amount of particulate matter. Thus the values of the pressure difference-based estimated amount PM2 that are successively derived following the end of such an increase in flow rate will converge to become approximately equal to the value of the pressure difference-based estimated amount PM2 that was obtained immediately prior to the start of the increase in exhaust gas flow rate. The operation of this embodiment is based on these assumptions.

Specifically, if it is judged in step S10 that the exhaust gas flow rate is increasing (i.e., that an increase is commencing) then after the processing of step S12, the processing of step S50 is executed for recording the pressure difference-based estimated amount PM2 at that time as a value PM2*b*, i.e., as the value of PM2 immediately prior to the start of the increase in the flow rate. Thereafter, after executing steps S13 to S16, if it is found in step S18 that the amount of change in the exhaust gas volumetric flow rate Vex exceeds the threshold value ΔV, then operation proceeds to step S52 in which the value of the pressure difference-based estimated amount PM2 at that time is acquired. Next in step S42, a decision is made as to whether the absolute value of the difference between PM2*b* and the currently obtained value of PM2 exceeds a threshold value ε. This processing serves to judge whether the detected pressure difference DP is accurately following the actual pressure difference across the DPF 34 that results from accumulated particulate matter in the DPF 34. The threshold γ is set at an appropriate value for enabling the presence of blockage to be detected, i.e., is made sufficiently large to ensure that the effects of blockage of the upstream-side tube 40*a* can be distinguished from the effects of errors in the values of PM2*b* and PM2, effects of electrical noise, etc.

With this embodiment, the above-described effects (1) to (3) and (6), (7) described for the first embodiment are also obtained.

Fourth Embodiment

A fourth embodiment will be described in the following, with the description being centered upon the points of difference from the first embodiment described above.

With this embodiment, the occurrence of blockage is judged based on the time required (following the end of an increase in the exhaust gas flow rate) for the successively derived values of the pressure difference DP to converge to a substantially steady-state condition, i.e., in which the value of DP becomes stabilized, as illustrated in FIG. 3(*c*) described above.

Figure 7:
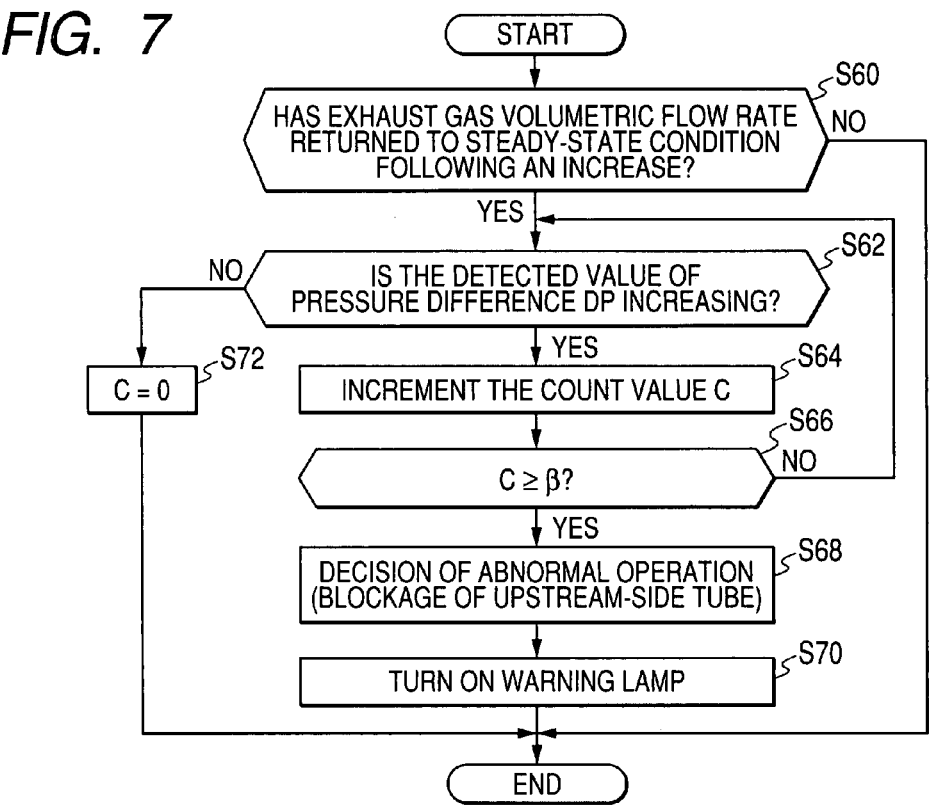
FIG. 7 is a flow diagram of processing executed for diagnosing occurrence of blockage in the pressure difference detection apparatus, with a fourth embodiment.

FIG. 7 is a flow diagram of the processing routine that is executed by the ECU 50 of this embodiment for diagnosing abnormal operation of the pressure difference detection apparatus 40, with the routine being executed at periodic intervals.

Firstly in step S60, a decision is made as to whether the flow rate of the exhaust gas has reached a stable condition, after an increase in the flow rate has occurred. If there is a YES decision, then operation proceeds to step S62 in which a decision is made as to whether the value of the pressure difference DP detected by the pressure difference detection apparatus 40 is increasing. This judgement is performed to determine whether DP is changing towards the actual value of pressure difference across the DPF 34, since at that point it can be expected that the actual value will have increased, due the increase in flow rate. If DP is found to be increasing, operation proceeds to step S64, in which a count value C is incremented. This counter value is used to detect the time that elapses until the detected pressure difference DP converges to a stable value, i.e., converges to the actual pressure difference, following an increase in the flow rate.

Next in step S66 a decision is made as to whether the counter value C exceeds a predetermined threshold value β, which is predetermined as corresponding to a time duration that is longer than the maximum duration that would be required (when the pressure difference detection apparatus 40 is operating normally) for the pressure difference DP to converge to a stable value after an increase in the exhaust gas flow rate, i.e., the maximum time that would be required for convergence if there is no blockage of the upstream-side tube 40a.

If it is judged in step S66 that the count C has not yet reached the threshold value β, then operation returns to step S62.

However if it is judged in step S66 that the count C is greater than or equal to the threshold value β, then operation proceeds to step S68, in which a decision is made that there is a blockage in the upstream-side tube 40a. Step S70 is then executed, in which a warning indication of the blockage is generated by the display apparatus 60 shown in FIG. 1.

If on the other hand it is judged in step S62 that DP is not increasing, then operation proceeds to step S72 in which the count C is reset to zero. Following step S72 or step S70, this execution of the processing routine is ended.

With this embodiment, the above-described effects (1), (6), (7) described for the first embodiment are also obtained.

Alternative Embodiments

Various modifications to the above embodiments could be envisaged, as described in the following.

Figure 8:
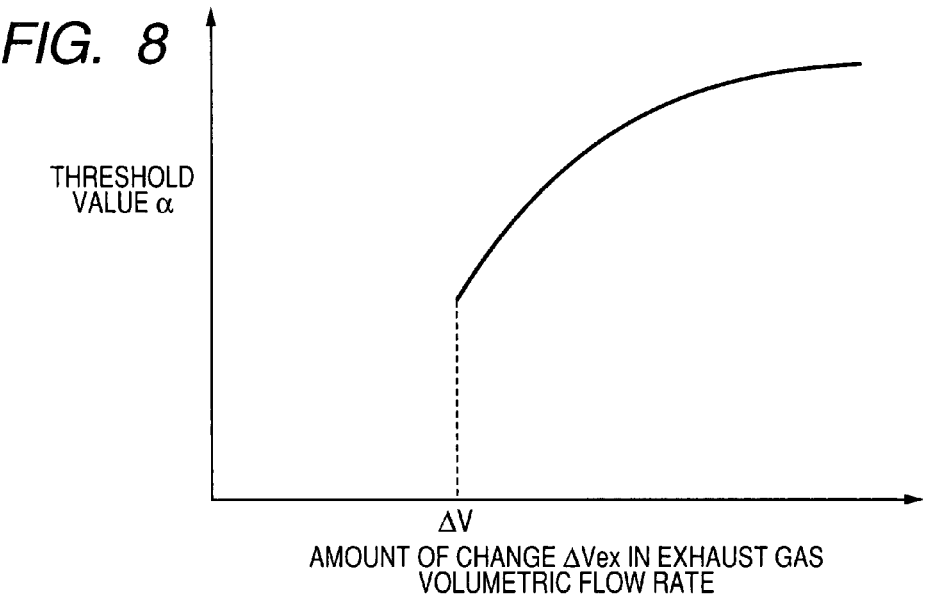
FIG. 8 is a graph for use in describing a modified embodiment.

With the first embodiment, it would be possible for the threshold value α to be a variable, which is set in accordance with the amount of change in the exhaust gas volumetric flow rate Vex, as illustrated in FIG. 8. Similarly with the second embodiment, it would be possible for the threshold value λ to be a variable, which is set in accordance with ΔVex, and with the third embodiment, the threshold value ε could be a variable which is set in accordance with ΔVex.

The invention is not limited to the methods used in the first through third embodiments or the modifications described above, for diagnosing occurrence of blockage based on the detected pressure difference value DP. For example it would be possible to estimate the actual pressure difference across the DPF 34 (following a transient change in the exhaust gas flow rate) based upon the operation history-based estimated amount PM1 and the exhaust gas volumetric flow rate Vex, and to judge the occurrence of blockage of the upstream-side tube 40a based on the manner of convergence of the detected pressure difference DP towards that estimated actual pressure difference value.

Furthermore the invention is not limited to the method of calculating the operation history-based estimated amount PM1 used with the above embodiments. For example, as described in Japanese patent publication No. 2006-2672, it is possible to calculate an updated value dPm each time that the calculation processing is executed, based on the air/fuel ratio of the exhaust gas and on the engine speed, and to calculate the operation history-based estimated amount PM1 by integrating the successively calculated dPm values.

Furthermore it would for example be equally possible to use the method of calculating the accumulated amount of particulate matter that is described in reference document 1 above.

Moreover the invention is not limited to the above-described method of estimating the amount of particulate matter that is consumed by combustion, since it would for example be equally possible to use the method described in reference document 1.

Furthermore the invention is not limited to the method of calculating the pressure difference-based estimated amount PM2 used with the above embodiments. For example, PM2 could be calculated with the estimated temperature Td being replaced by the downstream exhaust gas temperature Teb.

What is claimed is:

1. A diagnostic apparatus for detecting abnormal operation of a pressure difference detection apparatus and diagnosing a cause of said abnormal operation, said pressure difference detection apparatus deriving a detected pressure difference between locations respectively upstream and downstream with respect to an exhaust gas cleansing device disposed within an exhaust gas system of an internal combustion engine, with said abnormal operation detection and diagnosis being performed based upon a value of detected pressure difference obtained from said pressure difference detection apparatus, wherein said diagnostic apparatus comprises judgement circuitry adapted to diagnose abnormal operation of said pressure difference detection apparatus caused by impeded transfer of gas between said pressure difference detection apparatus and said exhaust gas system, said diagnosis being based upon a manner of convergence of said detected pressure difference to a specific value following completion of a transient change in a flow rate of said exhaust gas.

2. A diagnostic apparatus as claimed in claim 1, wherein a magnitude of said transient change in said flow rate exceeds a predetermined value.

3. A diagnostic apparatus as claimed in claim 1, comprising circuitry adapted to derive a first estimated amount of accumulated particulate matter within said exhaust gas cleansing device, independently of results produced from said pressure difference detection apparatus, and derive a second estimated amount of said accumulated particulate matter within said exhaust gas cleansing device, based on results produced from said pressure difference detection apparatus, wherein said judgement circuitry is adapted to perform said diagnosis based upon a relationship of successively derived values of said second estimated amount of accumulated particulate matter to a value of said first estimated amount of accumulated particulate matter, following completion of said transient change in exhaust gas flow rate.

4. A diagnostic apparatus as claimed in claim 3, comprising first estimation circuitry adapted to calculate said first estimated accumulated amount of particulate matter within said exhaust gas cleansing device, by periodically calculating successive estimated incremental amounts of said particulate matter and integrating said incremental amounts, with each said incremental amount being estimated based upon a current operating condition of said internal combustion engine, second estimation circuitry adapted to calculate said second estimated accumulated amount of accumulated particulate matter within said exhaust gas cleansing device, based upon said exhaust gas flow rate and said detected pressure difference, in combination;

wherein said judgement circuitry is adapted to derive said manner of convergence of said detected pressure difference values based upon a manner of convergence of said second estimated accumulated amount of particulate matter to a value of said first estimated accumulated amount of particulate matter subsequent to completion of said transient change in the exhaust gas flow rate.

5. A diagnostic apparatus as claimed in claim 4, comprising circuitry adapted to calculate an amount of change in said first estimated amount of accumulated particulate matter between commencement and completion of said transient change in exhaust gas flow rater and to calculate an amount of change in said second estimated amount of accumulated particulate matter between commencement and completion of said transient change in exhaust gas flow rate, wherein said judgement circuitry is adapted to derive said manner of convergence of said detected pressure difference based upon a manner of convergence of successively derived values of said amount of change in the second estimated accumulated amount of particulate matter towards a value of said amount of change in the first estimated accumulated amount of particulate matter, subsequent to completion of said transient change in the exhaust gas flow rate.

6. A diagnostic apparatus as claimed in claim 5, wherein said judgement circuitry is adapted to:

make a provisional decision that said condition of impeded transfer of gas exists, when an absolute value of a difference between said amount of change in the second estimated values and said amount of change in the first estimated values attains a specific threshold value following completion of said transient change, and make a definitive decision that said condition of impeded transfer of gas exists, when a predetermined time interval elapses before said absolute difference falls below said threshold value subsequent to reaching said provisional decision.

7. A diagnostic apparatus as claimed in claim 5, wherein said threshold value is determined in accordance with said exhaust gas flow rate.

8. A diagnostic apparatus as claimed in claim 1, wherein said transient change comprises an increase in said exhaust gas flow rate.

9. A diagnostic apparatus as claimed in claim 1, wherein said pressure difference detection apparatus comprises a first passage and a second passage which respectively communicate with locations upstream and downstream from said exhaust gas cleansing device within said exhaust gas system, and a sensor adapted to derive said detected pressure difference as an amount of pressure difference between said first passage and said second passage.

10. A diagnostic apparatus as claimed in claim 4, wherein said judgement circuitry is adapted to derive said manner of convergence of said detection results from said pressure difference detection apparatus values based upon a manner of convergence of said successively obtained values of said second estimated accumulated amount of particulate matter towards a value of said first estimated accumulated amount of particulate matter, subsequent to completion of said transient change in exhaust gas flow rate.

11. A diagnostic apparatus as claimed in claim 10, wherein said judgement circuitry is adapted to:

make a provisional decision that said condition of impeded transfer of gas exists when an absolute value of a difference between said second estimated accumulated amount of particulate matter and said first estimated accumulated amount of particulate matter attains a specific threshold value following completion of said transient change in exhaust gas flow rate, and make a definitive decision that said condition of impeded transfer of gas exists when a predetermined time interval elapses before said absolute difference falls below said threshold value, subsequent to reaching said provisional decision.

12. A diagnostic apparatus as claimed in claim 1, comprising circuitry adapted to calculate an estimated accumulated amount of particulate matter within said exhaust gas cleansing device, based upon currently derived values of said exhaust gas flow rate and said detected pressure difference, in combination;

wherein said judgement circuitry is adapted to derive said manner of convergence of said detected pressure difference based upon a manner of variation of successively obtained values of said second estimated accumulated amount of particulate matter subsequent to completion of said transient change in exhaust gas flow rate.

13. A diagnostic apparatus as claimed in claim 12, comprising circuitry adapted to record a value of said first estimated accumulated amount of particulate matter at a commencement of said transient condition, wherein said judgement circuitry is adapted to derive said manner of convergence of said detection results from said pressure detection apparatus based upon a manner of convergence of successively obtained values of said second estimated accumulated amount of particulate matter to said recorded value, subsequent to completion of said transient change in exhaust gas flow rate.

14. A diagnostic apparatus as claimed in claim 13, wherein said judgement circuitry is adapted to:

make a provisional decision that said condition of impeded transfer of gas exists when an absolute value of a difference between said recorded value of the second estimated accumulated amount of particulate matter and said first estimated accumulated amount of particulate matter attains a specific threshold value subsequent to completion of said transient change in exhaust gas flow rate, and make a definitive decision that said condition of impeded transfer of gas exists, when a predetermined time interval elapses before said absolute value of difference falls below said threshold value subsequent to reaching said provisional decision.

15. A diagnostic apparatus as claimed in claim 1, wherein said judgement circuitry is adapted to:

detect a condition in which detected pressure difference values produced by said pressure difference detection apparatus begin to successively increase following completion of said transient change in exhaust gas flow rate, and, when said detected pressure difference values thereafter continue to successively increase for a duration longer than a predetermined time interval, make a decision that said condition of impeded transfer of gas exists.

* * * * *